United States Patent Office 2,851,425
Patented Sept. 9, 1958

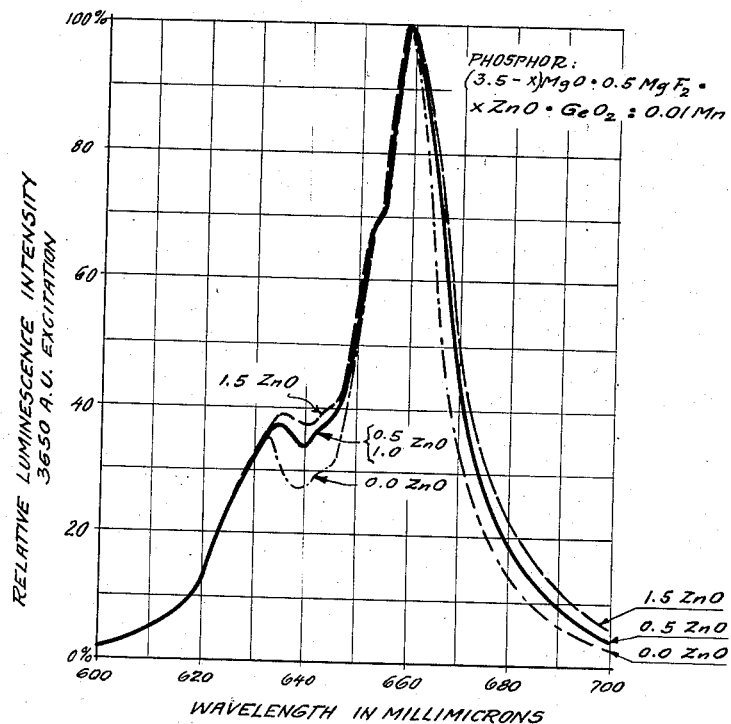
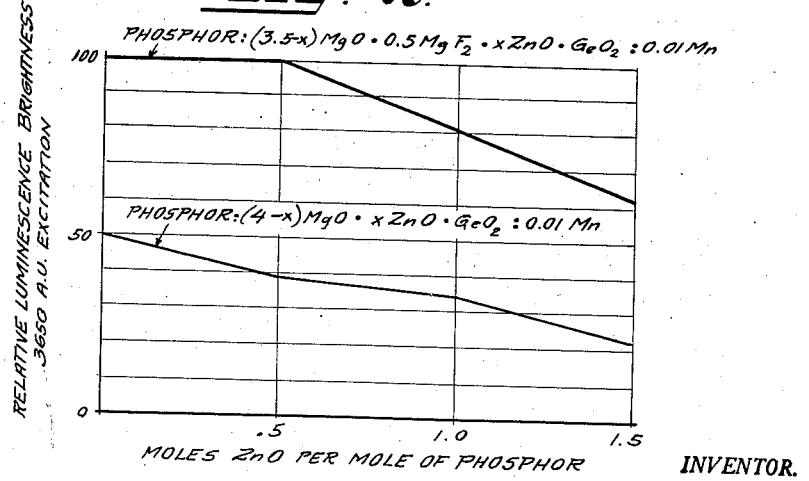

2,851,425

MANGANESE-ACTIVATED, MAGNESIUM-ZINC FLUOROGERMANATE PHOSPHOR

Luke Thorington, Berkeley Heights, N. J., assignor to Westinghouse Electric Corporation, East Pittsburgh, Pa., a corporation of Pennsylvania Application April 2, 1956, Serial No. 575,486

2 Claims. (Cl. 252—301.6)

This invention relates to phosphor materials and, more particularly, to phosphor materials which are useful in converting ultra violet radiation to red-rich visible radiation, and this application is a continuation-in-part of application Ser. No. 126,506, filed Nov. 10, 1949, now Patent No. 2,748,303 issued May 29, 1956, titled "Color-Corrected Light Source, Phosphors Therefor and Method" by Luke Thorington, the inventor herein, and assigned to the assignee of the instant application.

Phosphor materials having a predominantly red radiation are few in number. Such phosphor materials are useful in fluorescent lamps and similar applications in order to add red radiation to improve the color rendition for the light source so that objects illuminated by the light source will display a healthful and natural appearance.

In this aforementioned parent application, Ser. No. 126,506, there is disclosed a phosphor material having the molecular formula $xMgO \cdot yMgF_2 \cdot GeO_2:zMn$, in which $x$ is a number lying in the range between and including 2 and 6, $y$ is a number lying in the range between and including 2 and 0.1, and $z$ is a number lying in the range between and including 0.001 and 0.1. This phosphor is characterized by the fact that when excited by ultra violet radiations over a substantial range of exciting wave lengths, it emits substantial and effective quantities of radiation in the red region of the visible spectrum when subjected to and maintained at elevated temperatures for prolonged periods of time. The preferred formulation for this manganese-activated magnesium fluorogermanate phosphor is $3.5MgO \cdot 0.5MgF_2 \cdot GeO_2 : 0.01Mn$.

It is the general object of this invention to provide an improved phosphor material which has a high output in the red region of the spectrum.

It is a further object to provide a phosphor material which has improved output in the shorter wave length visible radiations and an output peak which is shifted toward the deep red as compared to manganese-activated magnesium fluorogermanate phosphor.

The aforesaid objects of the invention, and other objects which will become apparent as the description proceeds, are achieved by adding to the magnesium fluorogermanate phosphor from 0.1 mole to 1.5 moles of zinc oxide.

For a better understanding of the invention reference should be had to the accompanying drawing wherein Fig. 1 represents the spectral distribution for the phosphors of this invention as compared to the magnesium fluorogermanate phosphor described in the aforementioned parent application;

Fig. 2 represents relative luminescence brightness for the phosphors of this invention as compared to the phosphors described in Patent No. 2,447,449 to Williams.

In U. S. Patent No. 2,447,448 to Williams is described a magnesium germanate phosphor activated by manganese, the preferred formulation for this phosphor being $4MgO \cdot GeO_2 : Mn$. In U. S. Patent No. 2,447,449 to Williams there is described a phosphor wherein limited amounts of zinc oxide are substituted for an equivalent amount of magnesium oxide in the magnesium germanate phosphor in order to increase the efficiency of the magnesium germanate phosphor.

It has been found that a zinc oxide addition to the magnesium fluorogermanate phosphor described in parent application Ser. No. 126,506 will improve the response of the phosphor in the orange region of the spectrum and in addition will shift the maximum output peak further toward the deep red. It has been found that the zinc additions to the phosphor may be made from 0.1 mole to 1.5 moles with the rest of the phosphor constituents remaining as in the phosphor of the heretofore mentioned parent application with the optimum formulation for the improved phosphor of this invention being about $3MgO \cdot .5MgF_2 \cdot .5ZnO \cdot GeO_2 : .01Mn$. Thus the new and improved phosphor material of this invention has the molecular formulation $wMgO \cdot xMgF_2 \cdot yZnO \cdot GeO_2 : zMn$, where $w$ is from 2 to 6, $x$ is from 0.1 to 2, $y$ is from 0.1 to 1.5 and $z$ is from 0.001 to 0.1. Without these constituent limitations, the utility of the improved phosphor is limited.

In Fig. 1 is shown the effect on spectral distribution under 3650 A. U. excitation when varying the zinc oxide content with respect to the magnesium oxide content for the improved phosphors of this invention. In order to compare the phosphors of this invention with the phosphors described in the aforementioned Williams patents, the zinc oxide has been indicated as substituted for an equal molar amount of magnesium oxide in the preferred formulation for the manganese-activated magnesium fluorogermanate. At the maximum substitution of 1.5 moles ZnO, the formulation for the phosphor will be $2MgO \cdot .5MgF_2 \cdot 1.5ZnO \cdot GeO_2 : Mn$. It should be clear that whether the zinc oxide is expressed as a substituent for the magnesium oxide in the magnesium fluorogermanate or as an additive to the phosphor, the effects are the same provided the constituents of the improved phosphor of this invention are maintained within their aforementioned limitations. As observed in Fig. 1, wherein relative luminescence intensity in arbitrary units is plotted vs. wavelength in millimicrons, for the preferred magnesium fluorogermanate phosphor having no zinc oxide substitutent or additive, there is a pronounced dip in the spectral curve at about 640 mu. Where from 0.5 to 1 mole of zinc oxide is substituted for an equivalent molar amount of magnesium oxide in the preferred magnesium fluorogermanate phosphor there is much less dip at 640 mu and the output peak in the red is shifted slightly toward the deeper red. At 1.5 moles zinc oxide substitution in the preferred magnesium fluorogermanate phosphor, the dip at 640 mu is almost eliminated and there is a further shift in the output peak for the phosphor toward the longer wave lengths. It has been found that in order for the zinc oxide additive or substituent to have any measurable effect on the spectral distribution, there should be at least 0.1 mole of zinc oxide, and with more than 1.5 moles of zinc oxide per mole of the magnesium fluorogermanate the phosphor output decreases considerably.

In the upper curve of Fig. 2 is plotted relative luminescence brightness (in arbitrary units) vs. moles of zinc oxide substitution for magnesium oxide per mole of magnesium fluorogermanate phosphor; wherein the "zero" ZnO substitution represents the preferred magnesium fluorogermanate. In the lower curve in Fig. 2 are indicated the luminescence brightness readings for the phosphors as described in the aforementioned Williams patents, Nos. 2,447,448 and 2,447,449. In both curves of Fig. 2 the exciting radiation is 3650 A. U. The phosphor material $4MgO \cdot GeO_2 : Mn$ is indicated at the "zero" ZnO substitution for the lower curve, which phosphor has an output of 50 units as compared to the output of 100 units for the preferred magnesium fluorogermanate phosphor. Phosphors formulated in accordance with the Williams Patent No. 2,447,449 are indicated in the remaining portions of the lower curve in Fig. 2 and as shown, increasing the amount of zinc additive, or substituent, as the terminology may indicate, decreases the output somewhat. As noted before, the zinc oxide component for the phosphor materials has been treated as a substituent for the magnesium oxide, since this terminology was used by Williams, and for purposes of comparison with the prior art, the same terminology is used in describing the curves of Figs. 1 and 2. However, it does not matter whether one considers the zinc oxide an additive to the phosphor material or a substituent for the magnesium oxide component thereof, as long as the phosphor constituents are maintained within the aforestated limitations.

Referring again to the upper curve shown in Fig. 2, as zinc is included in the phosphor, the brightness does not increase, but as noted in Fig. 1, the spectral distribution for the phosphor does shift. The point at which maximum spectral shift is achieved without decreasing the relative luminescence brightness for the phosphor is 0.5 mole ZnO and for this reason this amount of zinc oxide is chosen as optimum. With more than 0.5 mole of ZnO per mole of phosphor the relative luminescence brightness for the phosphor decreases with respect to the magnesium fluorogermanate per se, but as shown in Fig. 1 the spectral distribution for the phosphor continues to shift. With more than 1.5 moles of ZnO, per mole of phosphor, the relative luminescence brightness for the phosphor decreases considerably.

The following are specific examples for preparing the phosphor materials of this invention.

*Example 1*

| Constituents: | Moles |
|---|---|
| MgO | 3.0 |
| MgF$_2$ | 0.5 |
| ZnO | 0.5 |
| GeO$_2$ | 1.0 |
| MnCO$_3$ | 0.01 |

The foregoing constituents are mixed wet with distilled water in a mortar and pestle. These mixed and wetted constituents are dried at 100° C. and are remixed dry and fired in platinum trays at a temperature of 1080° C. for 1 hour. The fired phosphor is ballmilled 1 hour and then refired at 1080° C. for from 4 to 48 hours.

*Example 2*

| Constituents: | Moles |
|---|---|
| MgO | 2.0 |
| MgF$_2$ | 0.5 |
| ZnO | 1.5 |
| GeO$_2$ | 1.0 |
| MnCO$_3$ | 0.01 |

The milling and firing procedures as given for Example 1 may be used for preparing the constituents for Example 2.

It will be recognized that the objects of the invention have been achieved by providing a phosphor material having improved luminescence in the orange region of the spectrum at about 640 mu, which phosphor also has an output peak which is shifted slightly toward the deep red.

While in accordance with the patent statutes, one best known embodiment of the invention has been illustrated and described in detail, it is to be particularly understood that the invention is not limited thereto or thereby.

I claim:

1. A phosphor material having the molecular formula $w$MgO·$x$MgF$_2$·$y$ZnO·GeO$_2$:$z$Mn, in which $w$ is from 2 to 6, $x$ is from 0.1 to 2, $y$ is from 0.1 to 1.5 and $z$ is from 0.001 to 0.1.

2. A phosphor material having a molecular formula of about 3MgO·0.5MgF$_2$·0.5ZnO·GeO$_2$:0.01Mn.

References Cited in the file of this patent

UNITED STATES PATENTS

| 2,447,448 | Williams | Aug. 17, 1948 |
| 2,447,449 | Williams | Aug. 17, 1948 |
| 2,748,303 | Thorington | May 29, 1956 |